United States Patent Office

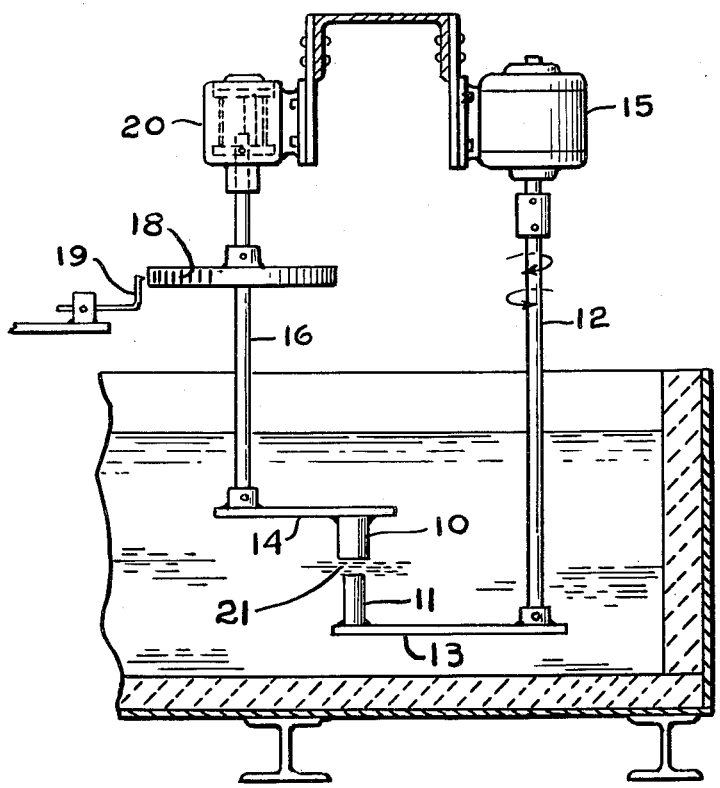

3,107,520
Patented Oct. 22, 1963

3,107,520
METHOD AND APPARATUS FOR MEASURING
VISCOSITY
Raymond J. Mouly and Javier A. Pabalan, Jr., Corning,
N.Y., assignors to Corning Glass Works, Corning, N.Y.,
a corporation of New York
Filed Sept. 30, 1960, Ser. No. 59,628
8 Claims. (Cl. 73—60)

The present invention relates to the measurement of the viscosity of fluids and more particularly to an instrument for providing continuous and instantaneous measurements of the viscosity of both stationary and moving fluids at any desired location and adapted for inclusion in an automatic control system for regulating the viscosity of such fluids.

In many processes, for example glass production, it is desirable to regulate the viscosity of intermediate products in order to control the characteristics of the end product. When articles are formed mechanically from such materials as molten glass, product uniformity is adversely affected by variations in the viscosity of the molten glass.

Prior methods and instruments for measuring viscosity have been subject to inherent disadvantages. The operation of some viscometers has necessitated removing a sample of the fluid and thereafter measuring the viscosity of the sample, thereby introducing error due to the fact that variations were not detected until after they had already affected the process. Other viscometers capable of measuring the viscosity of the fluid in situ have been subject to error caused either by unwanted motion of the fluid or by differential viscous drag on the various moving parts of the instrument when used to obtain measurements at varying depths.

Accordingly, it is an object of the present invention to provide an instrument adapted for making continuous measurements of the viscosity of both stationary and moving fluids at localized regions at varying depths with minimum error and adapted also for inclusion in an automatic control system for maintaining the viscosity of a fluid at a constant value.

To accomplish this purpose, the present invention provides means for producing a periodic viscous coupling between the opposed surfaces of two probes immersed in the fluid, one of which is caused to move periodically with respect to the other and the other of which is suspended so as to offer resistance to motion in the direction induced by the periodic viscous coupling. Such periodic motion may be in the nature of either oscillation or a unidirectional periodic motion such as revolution about an axis as will be hereinafter described. As a consequence of the coaction on one probe of the periodic viscous force and the resisting force, there is a resultant oscillatory motion of the probe, the amplitude of which is a function of the viscosity of the fluid. Since viscosity is a function of the amplitude of a complete cycle of oscillation, and since the effect of uniform flow of the fluid being tested is to add to the movement in one direction the same amount that it subtracts from movement in the opposite direction, it follows that measurements provided by the present viscometer are independent of the effects of uniform fluid motion.

Although numerous mechanical arrangements can be utilized to effect such a continuously opposed periodic viscous coupling between two surfaces, such variations will be apparent to those skilled in the art from the following description of two preferred modes of operation of an instrument constructed according to the present invention.

The accompanying diagram represents an elevational view of one embodiment of the present invention.

In the course of the following description it will be seen that the illustrated embodiment can be used to produce oscillation in either of two days with only slight modification of the apparatus.

Referring to the drawing, the two opposed surfaces comprise one base from each of two right circular cylinders 10 and 11. According to one method of operation cylinder 11, the motor probe, is caused to oscillate slowly by means of force transmitted from any appropriate power source 15 through motor shaft 12 and motor arm 13 at a rate depending for optimal performance upon the approximate value of the viscosity range being tested, the approximate density of the fluid and the distance of separation of the surfaces. The oscillation of motor probe 11 sets up an oscillation in the fluid between the opposed bases of the cylinders which in turn causes cylinder 10, the sensing probe, to oscillate. The amplitude of the oscillation induced in sensing probe 10, due to the viscous coupling, is a function of the viscosity of the fluid 21, which is that portion of the fluid which is between the probes. The oscillation of sensing probe 10 is transmitted through sensing arm 14 and sensing shaft 16 to any appropriate measuring device, indicated generally in the drawing by circular scale 18 and pointer 19. Sensing probe 10 is subject to a restraining force provided by torque cage 20. Said force tends to hold the probe in a predetermined position, corresponding to a reading of zero on the scale and tends to move the probe back to said position when it is displaced therefrom. The torque cage is mounted in a stationary position and is constructed so as to prevent motion of the sensing probe other than rotation or oscillation about its axis and may be constructed in ways well known in the art. Power source 15 is also mounted in a stationary position.

The amplitude of oscillation of the sensing components can be measured also by means of a transducer and other means known in the art. An output signal may be produced indicating the amplitude of oscillation, which signal may be compared with a predetermined standard signal. Differences between the output signal and the standard signal may be utilized according to conventional techniques to effect changes in the process variables affecting viscosity. Due to the ability of the present viscometer to produce continuous measurements, variations in viscosity can be restricted to a very narrow range.

Motor probe 11 is preferably smaller in diameter than sensing probe 10 by an amount such that during oscillation the smaller cylinder is always completely beneath the larger, thereby minimizing inaccuracies due to end effects. The relative positions and sizes of the probes may be reversed in other embodiments of the invention, and it is not essential that the probes differ in diameter. Arms 13 and 14 are constructed so as to offer minimum resistance to motion in the fluid and are separated by a distance sufficient to avoid any substantial viscous coupling therebetween. By way of example, an effective viscometer can be constructed having the following dimensions: shafts 12 and 16, 1" in diameter; distance between axes of shaft 16 and probe 10, 2"; distance between axes of shaft 12 and probe 11, 2¼"; diameter of probe 11, 1"; diameter of probe 10, 1½"; separation of probes, ¼"; amplitude of oscillation of probe 11, 3/32"; frequency of oscillation of probe 11, ½ cycle per second. It is to be understood that these dimensions are merely by way of example and are not intended as limitations on the invention.

Shafts 12 and 16 are maintained at the smallest diameter that will produce torsional rigidity. Since the total viscous drag on a rotating shaft is proportional to the amplitude and frequency of its oscillation and to the square of its radius, the combination of a small diameter sensing shaft with small amplitudes and low frequencies of oscillation results in a negligible differential in viscous drag on the apparatus when it is immersed at differing depths in the fluid.

As previously pointed out, one of the advantages of the present viscometer is its ability accurately to measure the viscosity of fluids in motion. If the fluid being tested is moving uniformly, it will have a constant effect on the position of sensing probe 10. The result will be a displacement depending upon both the viscosity and the velocity of the fluid. Thus, in the illustrated embodiment of the invention, when the motor elements are motionless, the scale and pointer will nevertheless show a displacement from the zero point if the fluid being tested is in motion. When the motor elements are set in motion, the result will be an oscillation about this displaced set point. Since the effect of the motion of the fluid is to add to the magnitude of the oscillation in one direction from the zero point the same amount that it subtracts from the magnitude of the oscillation in the other direction, the amplitude of a complete cycle of oscillation will be nearly independent of the effects of the motion of the fluid and will be a measure of viscosity. The viscometer can also be utilized to measure the magnitude of the component of the velocity of the fluid which is in the direction of motion of the sensing probe at the same time that it is measuring its viscosity, the said component being a function both of the distance between the displaced set point and the zero point and of the measured viscosity.

The illustrated apparatus may be slightly modified so as to permit rotation of motor shaft 12 continuously in the same direction. Motor probe 11 will then rotate continuously about the axis of shaft 12, coming into opposition with sensing probe 10 only once during each revolution. The result will be periodically to displace probe 10 generally in the direction of rotation of probe 11. The opposing force originating in the torque cage 20 will affect the return of sensing probe 10 to its rest position after the motor probe has passed. In this, as in the previously described mode of oepration, the fluid motion will alternately add to the movement of the sensing probe in one direction and subtract from movement in the opposite direction, thereby rendering the amplitude of a complete cycle of oscillation independent of such fluid motion.

An additional advantage of viscometers according to the present invention is their relative independence from the effects of the boundaries of the fluid container. The construction of the present viscometer, wherein viscosity measurements result from very slight motion of a small portion of the fluid localized between the probes and slight motion of the sensing probe, minimizes any viscous couplings between the various moving parts of the apparatus and the sides of the fluid container. Consequently, the viscometer may be used to take readings at varying points within a fluid container or channel with a minimum of distortion.

It is to be understood that the present invention is not limited to the described embodiments. Other means within the spirit of the invention may be utilized to effect a relative periodic motion between a sensing probe and a localized portion of the fluid to be tested. For example, the motor and sensing probes need not move about the axes of respective shafts, but may have their motion determined with reference to any other appropriate means. In other embodiments the opposed surfaces of the probes need not be plane surfaces.

It should be understood from the above disclosure that the present invention is not limited to any specified embodiments but that it is limited only by the novel method of operation which unites the various mechanical embodiments. Other apparatus may be utilized to effect periodic viscous coupling to produce oscillation of a sensing probe and to give the advantages inherent in such oscillation. Such apparatus will be apparent to those skilled in the art, and it is therefore intended that the present invention be limited only by the scope of the appended claims.

What is claimed is:

1. The method of measuring the viscosity of a fluid which comprises immersing a probe in said fluid at a predetermined position, exerting a restraining force when said probe is displaced from said predetermined position, said restraining force tending to return said probe to said predetermined position, effecting periodic motion of a portion of said fluid in proximity with said probe by means other than said probe and thereby producing a periodic viscous force upon said probe tending to displace said probe and coacting with said restraining force to produce oscillation of said probe and measuring the amplitude of said oscillation as an indication of the viscosity of said fluid.

2. The method of measuring the viscosity of a fluid which comprises immersing a probe in said fluid at a predetermined position, exerting a restraining force when said probe is displaced from said predetermined position, said restraining force tending to return said probe to said predetermined position, effecting oscillation of a portion of said fluid in proximity with said probe by means other than said probe and thereby producing an oscillating viscous force upon said probe tending to displace said probe and coacting with said restraining force to produce oscillation of said probe and measuring the amplitude of said oscillation as an indication of the viscosity of said fluid.

3. The method of measuring the viscosity of a fluid which comprises immersing a probe in said fluid at a predetermined position, exerting a restraining force when said probe is displaced from said predetermined position, said restraining force tending to return said probe to said predetermined position, effecting a substantially unidirectional periodic motion of a portion of said fluid in proximity with said probe by means other than said probe and thereby producing a substantially unidirectional periodic viscous force upon said probe tending to displace said probe and coacting with said restraining force to produce oscillation of said probe and measuring the amplitude of said oscillation as an indication of the viscosity of said fluid.

4. An instrument for measuring the viscosity of a fluid comprising a first probe immersible in said fluid, means for oscillating said first probe, a second probe immersible in said fluid, means tending to maintain said second probe at a predetermined position in opposition to said first probe by exerting a restraining force when said second probe is displaced therefrom, said restraining force tending to return said second probe to said predetermined position and means for measuring the amplitude of the oscillation away from said predetermined position induced in said second probe by the viscous coupling between said first and second probes coacting with said restraining force.

5. An instrument for measuring the viscosity of a fluid comprising a first probe immersible in said fluid and having a first plane surface, means for oscillating said first probe in a plane parallel to said first plane surface, a second probe immersible in said fluid and having a second plane surface opposed to and parallel to said first plane surface and spaced therefrom, means tending to maintain said second probe at a predetermined position by exerting a restraining force when said second probe is displaced therefrom, said restraining force tending to return said second probe to said predetermined position and means for measuring the amplitude of oscillation away from said predetermined position induced in said second probe by the viscous coupling between said first and second probes coacting with said restraining force.

6. An instrument for measuring the viscosity of a fluid comprising a first shaft capable of being oscillated about a first axis, means for effecting oscillation of said first shaft about said first axis, a first probe rigidly connected to said first shaft and immersible in said fluid, said first probe having a first plane surface extending perpendicular to the said first axis, a second probe immersible in said fluid at a predetermined position and having a second plane surface opposed to and parallel to said first plane surface and spaced therefrom, said second probe being rigidly connected to a second shaft capable of being oscillated about a second axis perpendicular to the said second plane surface, means providing resistance to the oscillation of said second shaft about said second axis by exerting a restraining force tending to return said second shaft to said predetermined position when it is displaced therefrom and means for measuring the amplitude of the oscillation induced in said second probe by the viscous drag of the fluid between said first and second plane surfaces coacting with said restraining force.

7. An instrument for measuring the viscosity of a fluid comprising a first shaft capable of being rotated about a first axis, means for effecting rotation of said first shaft about said first axis, a first probe rigidly connected to said first shaft and immersible in said fluid, said first probe having a first plane surface extending perpendicular to said first axis, a second probe immersible in said fluid at a predetermined position and having a second plane surface parallel to the said first plane surface and spaced therefrom, said first probe being located so as periodically to oppose said second probe as said first probe is rotated about said first axis, said second probe being rigidly connected to a second shaft capable of being oscillated about a second axis perpendicular to the said second plane surface, means providing resistance to the oscillation of said second shaft about said second axis by exerting a retraining force tending to return said second shaft to said predetermined position when it is displaced therefrom and means for measuring the amplitude of the oscillation induced in said second probe by the viscous coupling of the fluid between said first and second plane surfaces coacting with said restraining force.

8. An instrument according to claim 6 in which one of the said plane surfaces is smaller than the other by an amount such that during oscillation every point of the smaller surface is always directly opposite some point on the larger surface.

References Cited in the file of this patent

UNITED STATES PATENTS

| | | |
|---|---|---|
| 2,026,297 | Bell | Dec. 31, 1935 |
| 2,607,217 | Merten et al. | Aug. 19, 1952 |
| 2,738,670 | Coene | Mar. 20, 1956 |
| 2,752,778 | Roberts et al. | July 3, 1956 |
| 2,817,231 | Barstow | Dec. 24, 1957 |